Patented Apr. 2, 1929.

1,707,585

UNITED STATES PATENT OFFICE.

CHARLES E. TURRELL, OF LAKEWOOD, OHIO, ASSIGNOR TO THE MONOBLOC COMPANY, OF DOVER, OHIO, A CORPORATION OF OHIO.

PROCESS OF MOLDING.

No Drawing. Application filed September 30, 1926. Serial No. 138,813.

This invention relates to a moldable compound and the process of molding or producing a molded article therefrom.

The object of the invention is to provide a plastic compound which can be molded to produce articles having certain desired characteristics, such as hardness and durability with lack of brittleness, certain chemical changes taking place in the mixing operation and immediately following the molding so as to obtain the desired characteristics without special treatments before or after the molding operation.

More particularly, it is the aim of the invention to provide a composition composed of a suitable base, such as one of several bituminous substances, mixed with other ingredients, such as vulcanizable rubber in such amount that whatever vulcanization takes place occurs during the mixing of the ingredients, and a cement which automatically hardens or sets after the molding operation, the characteristic brittleness of the base being eliminated and at the same time hard molded articles being obtained which have the requisite heat resistance, flexibility and toughness to adapt them for purposes for which hard rubber is now commonly employed, while, at the same time, the cost is much reduced by reason of the fact that less expensive ingredients are utilized and operations are dispensed with, such as the vulcanizing operation after molding.

The above objects are attained by the present invention which may be here briefly summarized as consisting in a moldable composition composed of certain ingredients and in a process of producing the compound and the finished article therefrom, as will be described in the specification and set forth in the appended claims.

My improved compound and process are adapted for the production of a great many articles, but they are employed very advantageously in the production of storage battery boxes, storage battery covers and the like, which are required to have a considerable degree of hardness, resistance to acid corrosion, and flexibility to avoid breakage and cracking. The compound can be used also in the production of other articles which are required to have a part or all of the above mentioned properties.

In producing my improved compound, I employ a number of ingredients, certain of which are particularly important by their action in shaping or determining the characteristics of the finished product and which undergo certain chemical changes and make it possible to eliminate expensive operations which heretofore have added much to the cost of the finished product without producing a product superior to that obtained from my improved compound and the process carried out by me in the production of the compound and the finished article. Among the ingredients, I employ an inexpensive base, preferably a bituminous product such as gilsonite, to which is added a fibrous substance such as cotton flox, one or more fillers including a cement, and a certain amount of vulcanizable rubber with sulphur. Just enough rubber and sulphur are added so that the rubber will vulcanize during the mixing and by the heat generated in the mixing, the rubber adding to the toughness and removing the brittleness of the bituminous base, care being exercised that the amount of vulcanized rubber thus produced does not destroy the plasticity of the compound nor interfere with the subsequent molding. However, by the addition of the rubber and sulphur a chemical reaction takes place in the mixing, the chief function of which is to reduce the brittleness of the gilsonite or other base.

While the rubber performs the desirable functions mentioned above, it would have one undesirable property, namely the reduction of heat resistance, which, if not counteracted would be detrimental for certain uses of the compound, such as, for example, the production of storage battery boxes, but this is overcome by the addition of the cement which sets or hardens shortly after the molding operation and increases the tensile strength and the resistance to heat. Thus the rubber, with the addition of the sulphur, undergoes a certain chemical change during the mixing, in the production of the plastic compound, and the dehydration or the setting and hardening of the cement results in another chemical change after the molding operation, both of these chemical changes having the distinct advantages pointed out above and taking place without any special treatment which would add to the cost of the product.

In addition to the ingredients above mentioned, I prefer to add a small percentage of wax or oil to prevent the compound sticking to the rolls in the mixing operation and to the parts of the mold in the molding operation and to dispense with the necessity of lubricating the parts of the mold as has frequently been required heretofore. Additionally, I may add as a filler an inert mineral dust, such as shale flour or slate flour, and there may be added to advantage so-called mineral rubber, such as genasco, which consists of a bituminous substance, such as gilsonite, blown with asphalt oil. This acts as a binder and assists in reducing the brittleness of the bituminous base.

The rubber which is added is preferably reclaimed devulcanized rubber which is usually obtained by grinding and devulcanizing waste rubber products such as tires.

While it is to be understood that I am not to be confined to the precise ingredients mentioned below nor to the proportions given, as these may be varied, very good results have been obtained by the admixture of the following ingredients mixed in substantially the following proportions by weight:

| | Parts. |
|---|---|
| Gilsonite | 81 |
| Mineral rubber | 10 |
| Wax or oil | 4 |
| Cotton flox | 40 |
| Portland cement | 25 |
| Shale or slate flour | 20 |
| Reclaimed rubber | 8 |
| Sulphur | 3 |

While the ingredients may be mixed in different ways, I have produced very satisfactory results by carrying out the process in the following manner:

The ingredients are all placed at once in a suitable mixer, such as a Banbury mixer, the ingredients being mixed and heated for approximately five minutes, a small amount of water being sometimes added just prior to the close of this mixing operation, about a quart of water being added to approximately 191 lbs. of the mixed ingredients. From the mixer the compound is then run through an ordinary rubber mill where the ingredients are further mixed and heated. Both in the mixer and in the rubber mill heat is generated by the friction of the rolls, steam, however, being generally supplied to the rolls of the mill to facilitate the mixing, increase the plasticity and assist in driving out the moisture to initiate the heating. The heat which is imparted to the compound in the mixer and in the mill produces the vulcanization of the rubber, the sulphur serving not only to vulcanize the rubber but also to harden the gilsonite and mineral rubber, but nevertheless the compound is plastic.

The compound is taken direct from the mill and placed in molds and molded to produce the final articles without any reheating or further treatment of the compound. The vulcanization of the rubber, while toughening the compound somewhat, does not destroy its plasticity nor does it make it sufficiently hard to prevent the molding of the finished articles when the compound is taken from the mill and placed in the molds.

Quantities of the compound are removed from the mixer and placed in the mill so as to keep a continuous supply in the mill for immediate use in the molds, the operator taking from the mill definite quantities of the compound and placing the same in the molds which are operated by hydraulic presses, a sufficient number of which are provided to consume the compound continuously passing through the mixer and mill.

The molds of the presses are preferably water-cooled, and after an article has been molded from the hot plastic compound it is allowed to remain in the molds for a brief period, say, two to three minutes, until the molded article has cooled and hardened sufficiently to permit it to be removed from the mold in a finished condition except for the removal of a small amount of flash, and after the article has been allowed to stand for a given time it reaches its permanently hard state by the setting of the cement which is, of course, now thoroughly intermixed throughout the article.

This results in an article or product having the characteristics explained in the early part of the specification, which characteristics are obtained by the use of the proper ingredients in the desired proportions and by the chemical changes which take place before and after the molding operation without, however, requiring special treatments for the particular purpose of bringing about these chemical changes.

In the rubber mill the ingredients are not only thoroughly mixed together and maintained in a plastic state notwithstanding the vulcanization of the rubber and possible partial setting of the cement, but the compound is uniformly heated throughout. Accordingly it is highly desirable that the compound be taken from the mill direct to the mold without giving the compound an opportunity to cool and without any additional or intermediate heating, for otherwise the plasticity of the compound would be adversely affected. An intermediate heating would tend to heat the compound more on the surface than on the interior and would result in the formation of a surface crust.

It is a well known fact that cement in itself is not acid proof, but this has no particular disadvantage when my improved compound and process are used in the production of storage battery boxes or other receptacles adapted to contain acid, for at most the acid will attack only the cement which is exposed on the inner surface of the box or receptacle, the cement lying outside of the inner surface being so enclosed or embedded in the ingredients inert to acid that the acid does not penetrate the walls. However, even the attacking of the cement which is exposed on the inner surface can be avoided by the use of a suitable substance which will render the cement inert to acid. An ingredient employed advantageously for this purpose is silicate of soda. In the use of this ingredient a suitable quantity is dissolved in water and mixed with the cement which is then supplied to the mixer with the other ingredients heretofore mentioned. When the cement has added to it the water-glass solution mentioned above, it is, of course, not necessary to later add any water to the mixer as is desirable if the water-glass solution is not employed.

It might be added in conclusion that not only does the water-glass render the cement inert to acids but it also adds to the heat resistance of the finished product, materially assisting the cement in this particular function.

Having thus described my invention, I claim:

1. A process of forming hard molded articles, which consists in mixing together a suitable base, a fibrous material, vulcanizable rubber and cement, the mixing taking place under a heat condition which vulcanizes the rubber, and removing a predetermined quantity of the heated plastic compound thereby formed and placing the same in a mold, molding the article and allowing the article to cool to harden it.

2. A process of producing molded articles which comprises mixing in a heated state a suitable base, a fibrous material, a material which will harden by the action of heat during the mixing operation, and a material which will harden after the molding operation in the absence of heat, and molding a quantity of the heated plastic compound thereby formed into the article to be produced and allowing the same to stand for a predetermined time to permit the article to assume its permanently hard condition.

3. A method of producing a molded article which comprises mixing together and forming a heated plastic compound from ingredients including a bituminous base, a fibrous substance, rubber, sulphur and cement, placing in a mold a definite quantity of the heated compound thus formed in the mixer, molding the article, and allowing it to cool and stand after molding so as to assume its permanent hardness by the setting of the cement.

In testimony whereof, I hereunto affix my signature.

CHARLES E. TURRELL.